US008405676B2

(12) United States Patent
DeRose et al.

(10) Patent No.: US 8,405,676 B2
(45) Date of Patent: Mar. 26, 2013

(54) TECHNIQUES FOR INTERIOR COORDINATES

(75) Inventors: Tony DeRose, San Rafael, CA (US); Mark Meyer, San Francisco, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 13/314,504

(22) Filed: Dec. 8, 2011

(65) Prior Publication Data

US 2012/0075340 A1    Mar. 29, 2012

Related U.S. Application Data

(63) Continuation of application No. 11/698,489, filed on Jan. 25, 2007, now Pat. No. 8,102,403.

(60) Provisional application No. 60/762,292, filed on Jan. 25, 2006.

(51) Int. Cl.
*G06T 15/00* (2006.01)
*G09G 5/00* (2006.01)

(52) U.S. Cl. ........ 345/606; 345/419; 345/653; 345/664; 345/665; 345/679; 345/680

(58) Field of Classification Search .................. 345/419, 345/606, 653, 664, 665, 668, 679, 680
See application file for complete search history.

(56) References Cited

U.S. PATENT DOCUMENTS

| | | | |
|---|---|---|---|
| 5,574,835 | A | 11/1996 | Duluk, Jr. et al. |
| 6,034,691 | A | 3/2000 | Aono et al. |
| 6,256,038 | B1 | 7/2001 | Krishnamurthy |
| 2001/0019333 | A1* | 9/2001 | Sasaki .......................... 345/653 |
| 2002/0030681 | A1 | 3/2002 | Ritter |
| 2006/0290693 | A1 | 12/2006 | Zhou et al. |

OTHER PUBLICATIONS

Carr et al., "Reconstruction and representation of 3D objects with radial basis functions." In SIGGRAPH 2001, Computer Graphics Proceedings, ACM Press / ACM SIGGRAPH, E. Fiume, Ed., 67-76.
Floater et al., "Mean value coordinates in 3D." Computer Aided Geometric Design, 22: 623-631.
Floater, "Mean value coordinates." Computer Aided Geometric Design, 20(1): 19-27.
Floater et al., "A general construction of barycentric coordinates over convex polygons." Advances in Comp. Math., 24: 311-331.
Joshi et al., "Harmonic coordinates for character articulation." Pixar Animation Studios, Pixar Technical Memo #06-02b.
Ju et al., "Mean value coordinates for closed triangular meshes." ACM Trans. Graph. 24(3): 561-566.
MacCracken et al., "Free-form deformations with lattices of arbitrary topology." In Proceedings of SIGGRAPH '96, Annual Conference Series, 181-199.
Meyer et al., "Generalized barycentric coordinates on irregular polygons." Journal of Graphic Tools, 7(1): 13-22.
Sederberg et al., "Free-form deformation of solid geometric models." In SIGGRAPH '86: Proceedings of the 13th annual conference on Computer graphics and interactive techniques, ACM Press, Dallas, TX, Aug. 1986, pp. 151-160.

(Continued)

*Primary Examiner* — Ke Xiao
*Assistant Examiner* — Robert Craddock
(74) *Attorney, Agent, or Firm* — Kilpatrick Townsend & Stockton LLP

(57) ABSTRACT

A method for determining interior coordinates is disclosed. The method includes receiving information specifying an object having a plurality of sites and a boundary. Interior coordinates associated with each of the plurality of sites are determined based on the boundary. The interior coordinate associated with each of the plurality of sites represent a system of coordinates that satisfy several properties, including non-negativity and interior locality. At least one value associated with the plurality of sites is then interpolated using the interior coordinates.

16 Claims, 12 Drawing Sheets

OTHER PUBLICATIONS

Sumner et al., "Mesh-based inverse kinematics." ACM Trans. Graph. 24(3): 488-495.

International Search Report and Written Opinion, PCT application No. PCT/US07/02310, dated Feb. 22, 2008, 7 pages.

Carr et al., "Reconstruction and representation of 3D objects with radial basis functions." In SIGGRAPH 2001, Computer Graphics Proceedings, ACM Press / ACM SIGGRAPH, E. Fiume, Ed., 67-76, 2001.

Choe et al., "Performance-driven muscle-based facial animation." The Journal of Visualization and Computer Animation, 12(2): 67-79, May 2007.

Duchon, "Splines minimizing rotation invariant seminorms in sobolev spaces." In Lecture Notes in Mathematics, Dold and Eckmann, Eds., Springer-Verlag, vol. 571, pp. 85-100, 1977.

Floater et al., "Mean value coordinates in 3D." Computer Aided Geometric Design, 22: 623-631, 2005.

Floater, "Mean value coordinates." Computer Aided Geometric Design, 20(1): 19-27, 2003.

Floater et al., "A general construction of barycentric coordinates over convex polygons." Advances in Comp. Math., 24: 311-331, 2006.

Joshi et al., "Harmonic coordinates for character articulation." Pixar Animation Studios, Pixar Technical Memo #06-02b, 2007.

Ju et al., "Mean value coordinates for closed triangular meshes." ACM Trans. Graph. 24(3): 561-566, 2005.

Iammers, Jim, and Iee Gooding. Maya 4.5 Fundamentals. New York: New Riders, Jan. 31, 2003. Print.

Loop et al., "A multisided generalization of bézier surfaces." ACM Trans. Graph., 8(3): 204-234, Jul. 1989.

MacCracken et al., "Free-form deformations with lattices of arbitrary topology." In Proceedings of SIGGRAPH '96, Annual Conference Series, 181-199, 1996.

Meyer et al., "Generalized barycentric coordinates on irregular polygons." Journal of Graphic Tools, 7(1): 13-22, 2002.

Pinkall et al., "Computing discrete minimal surfaced and their conjugates." Experimental Mathematics, 2(1): 15-36, 1993.

Riddle, Danny. Maya 4.5 for Windows and Macintosh: Visual Quickstart. Print, Mar. 28, 2003.

Sederberg et al., "Free-form deformation of solid geometric models." In SIGGRAPH '86: Proceedings of the 13th annual conference on Computer graphics and interactive techniques, ACM Press, Dallas, TX, Aug. 1986, pp. 151-160, 1986.

Sibson, "A brief description of natural neighbor interpolation." In Interpreting Multivariate Data, V. Barnett, Ed. Chapter 2, pp. 21-36, John Wiley & Sons, Ltd., 1981.

Sorkine, "State of the art report: Laplacian mesh processing." Computer Graphics Forum 25, Eurographics 2005.

Sumner et al., "Mesh-based inverse kinematics." ACM Trans. Graph. 24(3): 488-495, 2002.

Weck, Oliver De, and Il Y. Kim. "Finite Element Method." Web. <http://web.mit.edu/16.810/www/16.810_L4_CAE.pdf>, Jan. 12, 2004.

Hereafter known as Lammers in view of Deloura, Mark. Game Programming Gems (Game Programming Gems Series). New York: Charles River Media, Dec. 31, 2000. Print.

* cited by examiner

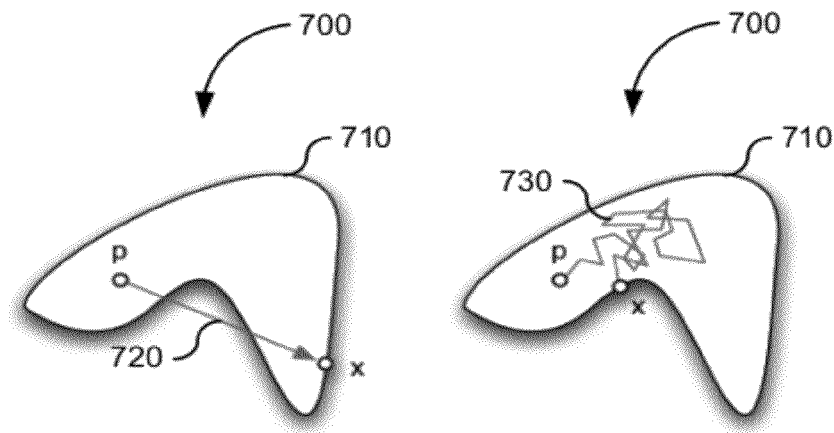
FIG. 7A    FIG. 7B
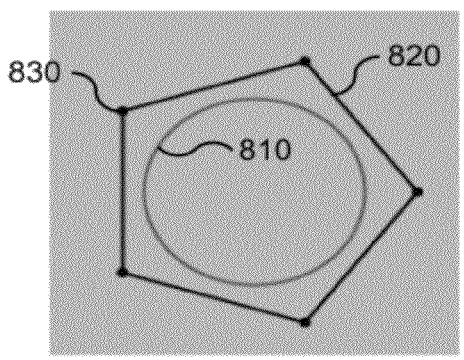
FIG. 8A
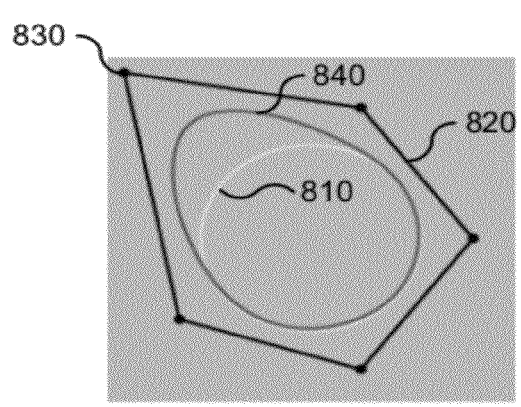 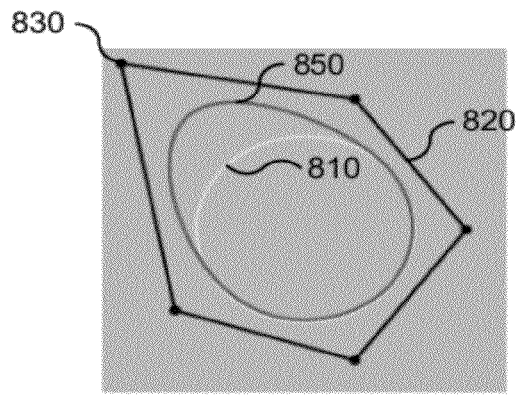
FIG. 8B    FIG. 8C

TECHNIQUES FOR INTERIOR COORDINATES

CROSS-REFERENCES TO RELATED APPLICATIONS

This application is a Continuation of U.S. patent application Ser. No. 11/698,489, filed Jan. 25, 2007 and entitled "Techniques for Interior Coordinates," which claims the benefit of and priority to U.S. Provisional Application No. 60/762,292, filed Jan. 25, 2006 and entitled "Harmonic Coordinates," the disclosure of which is hereby incorporated by reference in its entirety for all purposes.

BACKGROUND OF THE INVENTION

The present invention relates to computer graphics. More specifically, the present invention relates to techniques for creating and using interior coordinates.

Character articulation (sometimes called rigging) is an important component of animation systems, particularly the high-end kind used in feature film production. Most modern high-end systems, such as AutoDesk and Maya, offer a variety of articulation methods. Some examples of these articulation methods are enveloping, shape blending, and chains of arbitrary deformations.

In the realm of deformations, free-form deformation methods are particularly popular due to a number of advantages. First, free-form deformation methods offer smooth and intuitive control over the motion of the character using only a few parameters, namely, the locations of the free-form lattice control points. Second, there are virtually no restrictions on the three-dimensional model of the character. Typically, the only requirement is that the character model be completely enclosed by the control lattice. The above two advantages generally allow one to decouple the resolution of the control lattice from that of the character being deformed. The resolution of the lattice is chosen to match the amount of detail necessary in the deformation, whereas the resolution of the character model is chosen to capture the static detail of the character. Additionally, one can control the deformation of the same character model with a hierarchy of lattices, thereby allowing for multi-resolution articulation—a highly desirable component of a character articulation system.

However, free-form deformation methods come with some inconvenient drawbacks. Articulating a multi-limbed character is best accomplished using a lattice that conforms to the geometry of the character. However, given the topological rigidity of a lattice, it is often necessary to combine several overlapping lattices, and each of the lattices possesses interior points that can be difficult and annoying to articulate. Some attempts have been made to generalized lattices to arbitrary volume meshes, but these attempts required the introduction and articulation of interior control points, adding to the difficulty and complexity of animation.

Other attempts introduce an even more topologically flexible method where the character or object to be deformed is positioned relative to a coarse closed triangular surface mesh. The coarse closed triangular surface mesh is referred to as a "cage." The object is then "bound" to the cage by computing a weight at each cage vertex that is evaluated at the position of every point on the object. FIGS. 1A and 1B depict deformations of a simple object 110 bounded by a cage 120 generally in the prior art. FIG. 1A depicts simple object 110 bounded by cage 120 having a plurality of boundary points or vertices, including vertex 130. FIG. 1B depicts deformation of object 110 shown in FIG. 1A. As the cage vertices are moved to new locations to deform or articulate object 110, the deformed points for object 110 are computed from weights at each vertex of cage 120. FIG. 1B shows how, in this example, as vertex 130 is moved from lower right to upper left, object 110 is deformed resulting in object 140.

The weights at each cage vertex are generally known as generalized barycentric coordinates. One attempt for using generalized barycentric coordinate formulations is called Mean value coordinates (MVC). Mean value coordinates are particularly useful because the cage or cages that control deformation of an object can be any simple closed polygon in two dimensions, and any simple closed triangular mesh in three dimensions. Accordingly, mean value coordinates are also particularly interesting in the context of character articulation because the cage that controls the deformation can be any closed triangular surface mesh, so there is a great deal of topological and geometric flexibility when designing the cage. In addition, the mean value coordinates are smooth, so the deformation of the object is also smooth. Moreover, mean value coordinates reproduce linear functions, so the object does not "pop" when it is bound to the cage.

However, problems with methods using mean value coordinates are demonstrated with the articulation of bipedal character objects. Mean value coordinates lack non-negativity and interior locality. These two properties highly facilitate high-end character articulation. In regards to interior locality, the coordinates should fall off as a function of the distance between cage points and object points, where distance is measured within the cage. In regards to non-negativity, if an object point whose coordinate relative to a cage point is negative, it will move in the direction opposite to that cage point.

FIGS. 2A and 2B depict deformations of a bipedal character object 210 based on articulation of a cage 220 using mean value coordinates generally in the prior art. FIG. 2A depicts cage 210 having a plurality of vertices (e.g., vertex 220). In general, using mean value coordinates to provide deformation of bipedal character object 210, boundary points or vertices, such as vertex 230, that are modified on cage 220 influence the position of points on bipedal character object 210 in undesirable manners. For example, FIG. 2B depicts articulation of bipedal character object 230 shown in FIG. 2A using mean value coordinates. In this example, deformation of the left leg of bipedal character object 230 causes undesirable deformation to the right leg. As shown in FIG. 2B, deformation of the left leg using vertex 230 deforms the original bipedal character object 210 into bipedal character object 240.

FIG. 2B further shows how modified cage points (e.g., vertex 230) on the left leg significantly influence the position of object points along path 250 in the leg on the right. These undesirable effects typically occur because mean value coordinates are based on Euclidean (or straight-line) distances between points of the closed polygon and points of the model. Since the distance between the vertex 230 and the object points along path 250 in the leg on the right are relatively small in the bind pose, the influence is relatively large. This is because using mean value coordinates, distance between cage points and object points falls off using straight-line measurements, but not as distances measured within the cage. FIG. 2B further shows that the displacement of the object points along path 250 in the right leg is in a direction opposite to the displacement of vertex 230. This occurs because the mean value coordinates are negative. Although the influence is noticeable in still images, the undesirable movement of points on models is evident in interactive use and is highly undesirable for the articulation of characters in feature film production.

Accordingly, what is desired are improved methods and apparatus for solving the problems discussed above, while reducing the drawbacks discussed above.

BRIEF SUMMARY OF THE INVENTION

The present invention relates to computer graphics. More specifically, the present invention relates to techniques for creating and using interior coordinates.

In various embodiments, a method for using interior coordinates includes receiving information specifying a first object, the first object comprising a plurality of sites and a boundary. Interior coordinates associated with each of the plurality of sites are determined based on the boundary. At least one value associated with the plurality of sites is then interpolated based on the interior coordinates.

In some embodiments, interior coordinates associated with each of the plurality of sites may be determined as harmonic coordinates associated with each of the plurality of sites based on the boundary using harmonic functions.

In various embodiments, information is received specifying a second object. The second object may be associated with a first position inside the first object. Information specifying a change in the boundary of the first object then may be received. A second position may then be interpolated based on the first position in response to the change in the boundary to generate a graphical deformation of the second object.

In one embodiment, an output color value may be interpolated based on an input color value based on the interior coordinates. One or more input parameters associated with lighting functions may be interpolated based on the interior coordinates. In various embodiments, the at least one value associated with the plurality of sites may be interpolated based on the interior coordinates for use in finite element analysis. In some embodiments, the at least one value associated with the plurality of sites may be interpolated based on the interior coordinates to define a curve, surface, volume, and the like.

In various embodiments, information is received specifying a first portion of the plurality of sites as located on the boundary of the first object. Information may be received specifying a second portion of the plurality of sites as located inside the first object to provide interior control. Information may be received specifying the first object as defining a plurality of polygon faces bounding a region of space.

In some embodiments, a system includes a memory and a processor. The memory stores information specifying a first object, the first object comprising a plurality of sites and a boundary. The processor receives the information specifying the first object, and determines interior coordinates associated with each of the plurality of sites based on the boundary. The processor then interpolates at least one value associated with the plurality of sites based on the interior coordinates.

In one embodiment a computer program product stored on a computer readable medium configured to store instructions executable by a processor of a computer system is provided. The computer program product includes code for receiving information specifying a first object, the first object comprising a plurality of sites and a boundary, code for determining interior coordinates associated with each of the plurality of sites based on the boundary, and code for interpolating at least one value associated with the plurality of sites based on the interior coordinates.

In various embodiments, a method includes receiving information specifying a polytope, the polytope including a plurality of sites and a closed boundary, determining interior coordinates associated with each of the plurality of sites based on the closed boundary, and interpolating at least one value associated with the plurality of vertices based on the interior coordinates. The polytope may be a polygon. The polytope may also be a polyhedron.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 7A and 7B depict the different between interpolation for mean value coordinates and for interior coordinates in one embodiment according to the present invention.

FIGS. 8A, 8B, and 8C depict deformations of a simple object bound to a cage using mean value coordinates and using interior coordinates in one embodiment of the present invention.

DETAILED DESCRIPTION OF THE INVENTION

The present invention relates to computer graphics. More specifically, the present invention relates to techniques for creating and using interior coordinates.

In various embodiments, cage-based deformation techniques are disclosed that provide that the influence of each cage point falls off with distance as measured within the cage (interior locality) and is non-negative. In various embodiments, a "cage" that controls the deformations can be any closed polygon, such as a triangular surface mesh. In some embodiments, cage-based deformation techniques are disclosed that allow additional interior points, edges, and faces to optionally be added to refine the behavior of the deformation over the interior of the cage.

Accordingly, various embodiments provide a powerful deformation method using "interior coordinates" as discussed below for use in high-end character articulation. The various embodiments provide a great deal of topological and geometric flexibility when designing the cage. In addition, because the interior coordinates are smooth, the deformations generated by the system are also smooth. Furthermore, various embodiments provide that an object does not "pop" when bound to the cage.

Figure 1A:
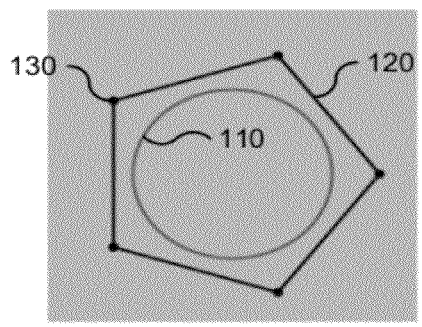
FIGS. 1A and 1B depict deformations of a simple object bounded by a cage generally in the prior art.
Figure 1B:
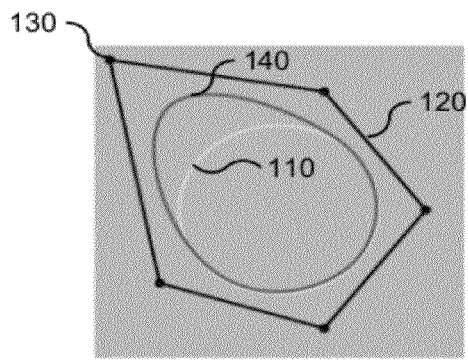
Figure 2A:
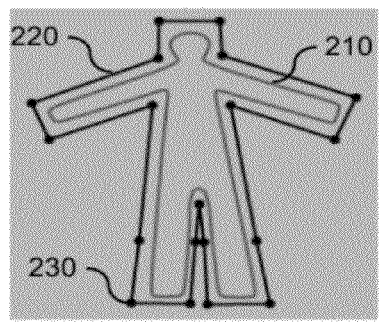
FIGS. 2A and 2B depict deformations of a bipedal character object based on articulation of a cage using mean value coordinates generally in the prior art.
Figure 2B:
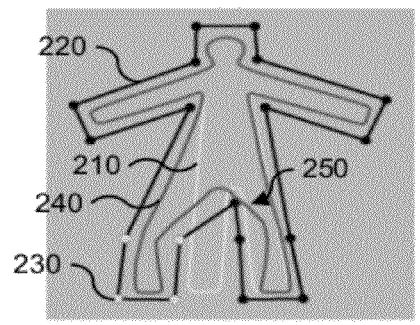
Figure 3:
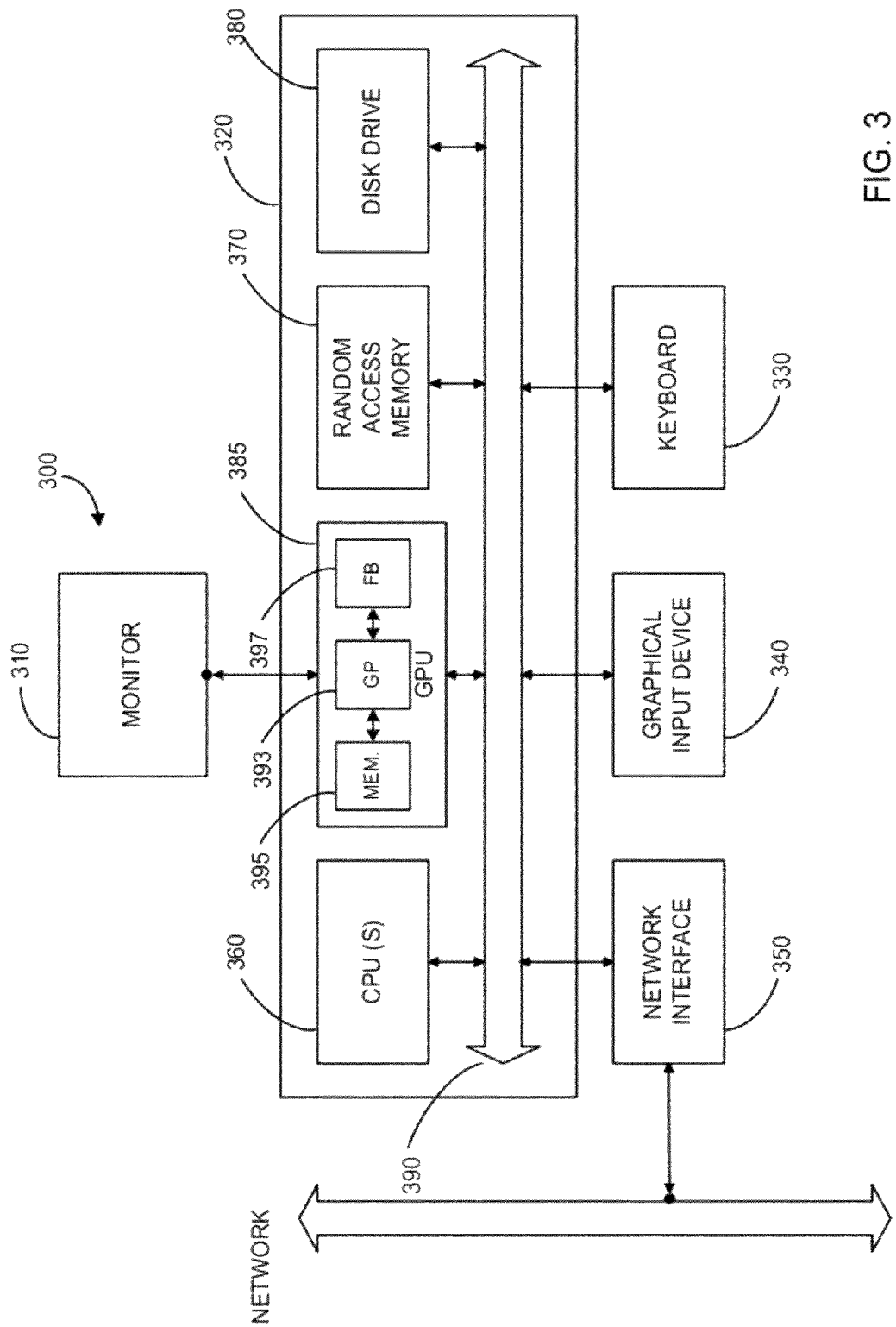
FIG. 3 depicts a computer system that may be used to practice embodiments of the present invention.

FIG. 3 is a block diagram of typical computer system 300 according to an embodiment of the present invention.

In one embodiment, computer system 300 typically includes a monitor 310, computer 320, a keyboard 330, a user input device 340, computer interfaces 350, and the like.

In various embodiments, user input device 340 is typically embodied as a computer mouse, a trackball, a track pad, a joystick, wireless remote, drawing tablet, voice command system, eye tracking system, and the like. User input device 340 typically allows a user to select objects, icons, text and the like that appear on the monitor 310 via a command such as a click of a button or the like.

Embodiments of computer interfaces 350 typically include an Ethernet card, a modem (telephone, satellite, cable, ISDN), (asynchronous) digital subscriber line (DSL) unit, FireWire interface, USB interface, and the like. For example, computer interfaces 350 may be coupled to a computer network, to a FireWire bus, or the like. In other embodiments, computer interfaces 350 may be physically integrated on the motherboard of computer 320, and may be a software program, such as soft DSL, or the like.

In various embodiments, computer 320 typically includes familiar computer components such as a processor 360, and memory storage devices, such as a random access memory (RAM) 370, disk drives 380, a GPU 385, and system bus 390 interconnecting the above components.

In some embodiment, computer 320 includes one or more Xeon microprocessors from Intel. Further, one embodiment, computer 320 includes a UNIX-based operating system.

RAM 370 and disk drive 380 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 300 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 385 may be any conventional graphics processing unit that may be user programmable. Such GPUs are available from NVIDIA, ATI, and other vendors. In this example, GPU 385 includes a graphics processor 393, a number of memories and/or registers 395, and a number of frame buffers 397.

FIG. 3 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In various embodiments, computer system 300 may be configured to determine generalized barycentric coordinates that satisfy a given set of properties disclosed herein that are useful for high-end computer animation. In one example of operation, computer system 300 determines interior coordinates that satisfy properties deficient in mean value coordinates. Computer system 300 may determine interior coordinates by numerical solutions to various equations.

In one embodiment, computer system 300 determines interior coordinates as "harmonic coordinates" as solutions of Laplace's equation in the cage interior. Since solutions to Laplace's equation are generically referred to as harmonic functions, the interior coordinates generated by computer system 300 are called harmonic coordinates, and the deformations generated by computer system 300 using harmonic coordinates are called "harmonic deformations." Other methods to generate interior coordinates may be used, given that the weights or values satisfy the set of properties discussed below, and are to be considered within the scope of the present invention.

Figure 4:
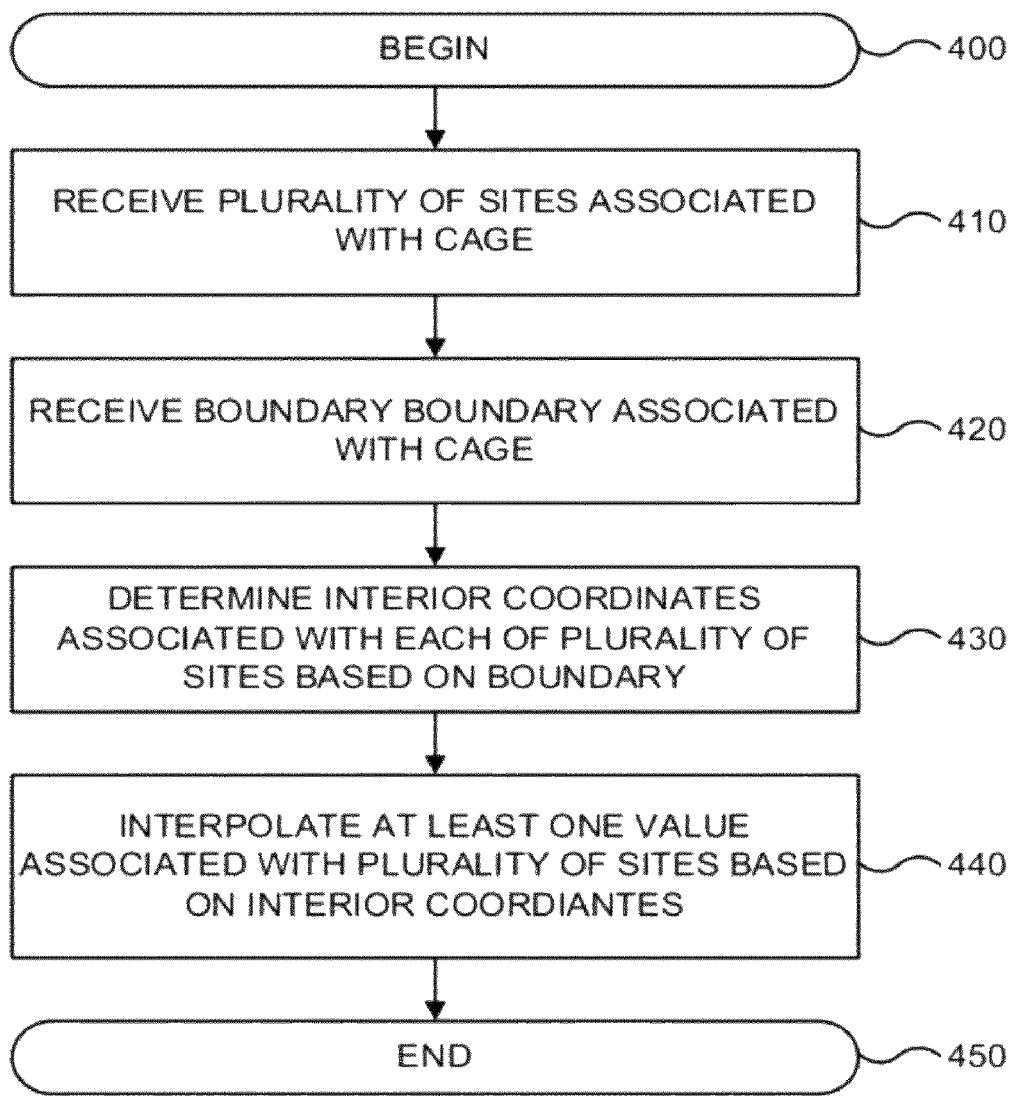
FIG. 4 is a simplified flowchart for using interior coordinates in one embodiment according to the present invention.

FIG. 4 is a simplified flowchart for using interior coordinates in one embodiment according to the present invention. The processing depicted in FIG. 4 may be performed by software modules (e.g., instructions or code) executed by CPU 360 of computer system 300, by hardware modules of computer system 300, or combinations thereof. FIG. 4 begins in step 400.

In step 410, computer system 300 receives information specifying a plurality of sites associated with a cage. Some examples of sites include points, vertices, curves, surfaces, meshes, and the like associated with the cage. In some embodiments, a portion of the sites are located on a boundary associated with the cage. In some embodiments, a portion of the sites are located inside the cage, as discussed further below. In step 420, computer system 300 receives information specifying a boundary associated with the cage. In one example, computer system 300 may receive a piece-wise linear boundary defined by a plurality of edges and the plurality of sites.

In step 430, computer system 300 determines interior coordinates associated with each of the plurality of sites based on the boundary. In general, "interior coordinates" refers to a system of coordinates determined at each of the sites with respect to the cage boundary that satisfy pre-determined criteria. One example for determining interior coordinates is discussed further below with respect to FIG. 5. In some embodiments, computer system 330 determines interior coordinates using harmonic functions. The coordinates are called "harmonic coordinates."

In step 440, computer system 300 interpolates at least one value associated with the plurality of sites based on the interior coordinates. FIG. 4 ends in step 450.

Figure 5:
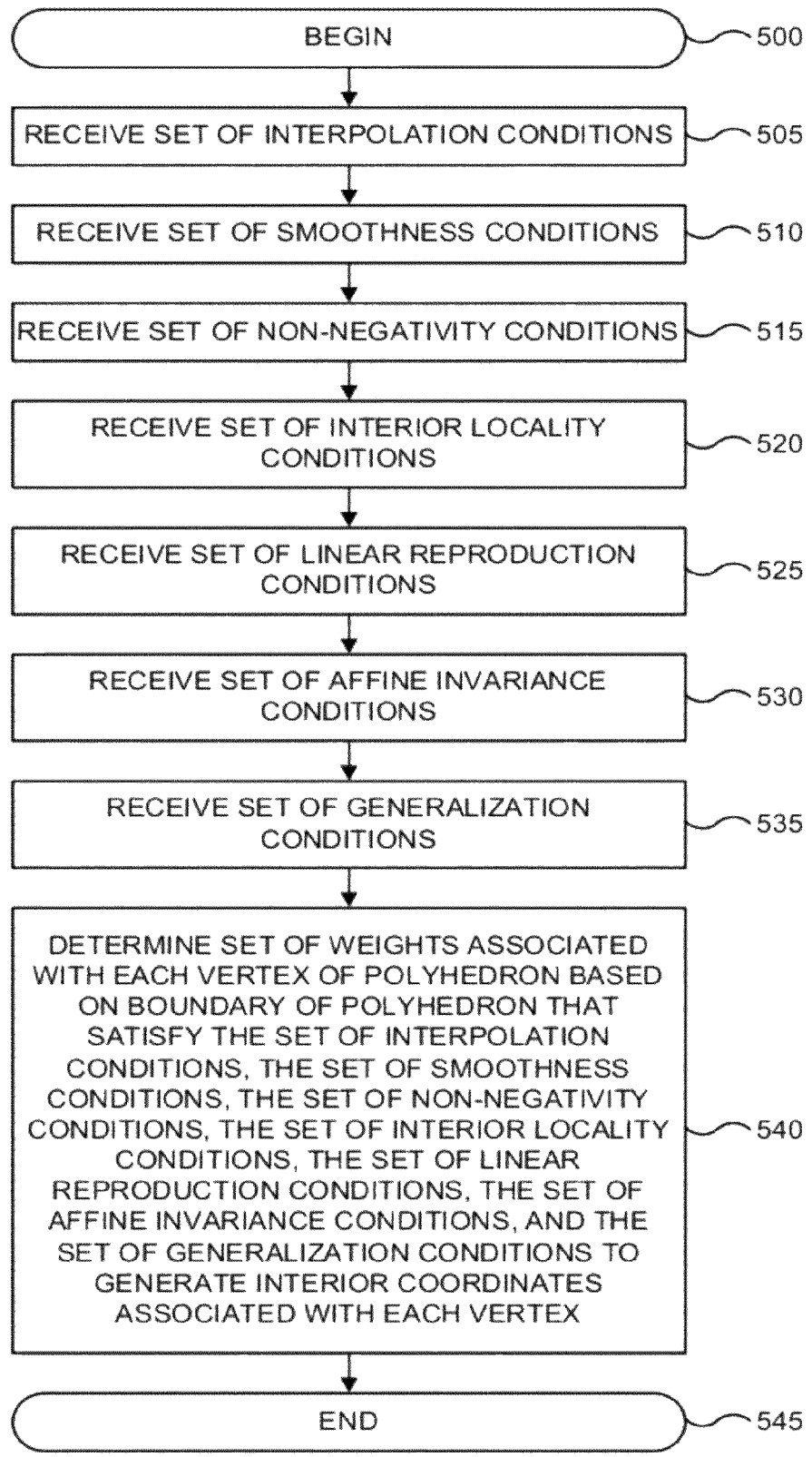
FIG. 5 is a simplified flowchart for generating interior coordinates in one embodiment according to the present invention.

FIG. 5 is a simplified flowchart for generating interior coordinates in one embodiment according to the present invention. The processing depicted in FIG. 5 may be performed by software modules (e.g., instructions or code) executed by CPU 360 of computer system 300, by hardware modules of computer system 300, or combinations thereof. FIG. 4 begins in step 500.

In step 505, computer system 300 receives a set of interpolation conditions. In step 510, computer system 300 receives a set of smoothness conditions. In step 515, computer system 300 receives a set of non-negativity conditions. In step 520, computer system 300 receives a set of interior locality conditions. In step 525, computer system 300 receives a set of linear reproduction conditions. In step 530, computer system 300 receives a set of affine invariance conditions. In step 535, computer system 300 receives a set of generalization conditions.

In step 540, computer system 300 determines a set of weights associated with each vertex of a polyhedron based on a boundary associated with the polyhedron that satisfy the set of interpolation conditions, the set of smoothness conditions, the set of non-negativity conditions, the set of interior locality conditions, the set of linear reproduction conditions, the set of affine invariance conditions, and the set of generalization conditions to generate interior coordinates associated with each vertex of the polyhedron.

In various embodiments, computer system 300 stores the set of weights as interior coordinates (e.g., in RAM 370). The stored interior coordinates may be subsequently used to interpolate values at each vertex to generate graphical deformations of objects "bound" to the cage in response to manipulation or articulation of the cage, to interpolate color values, input parameters associated with lighting functions, shading value, to interpolate values defining higher order curves, for using in finite element analysis, and the like. FIG. 5 ends in step 540.

Figure 6A:
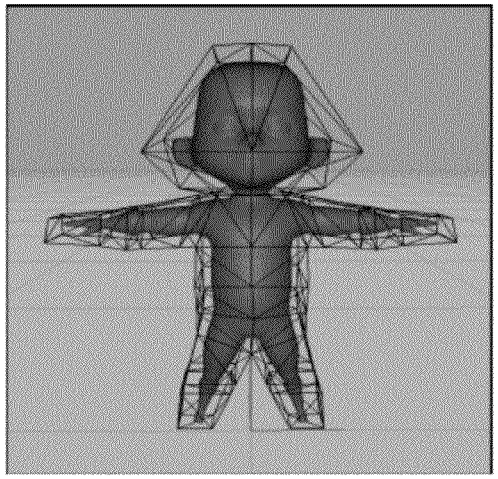
FIGS. 6A, 6B, 6C, and 6D depict deformations using interior coordinates in one embodiment according to the present invention.
Figure 6B:
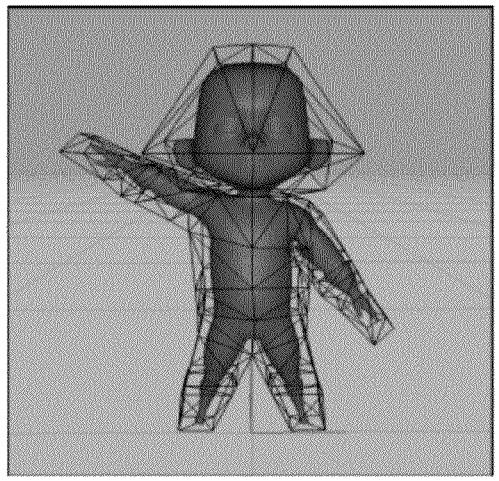
Figure 6C:
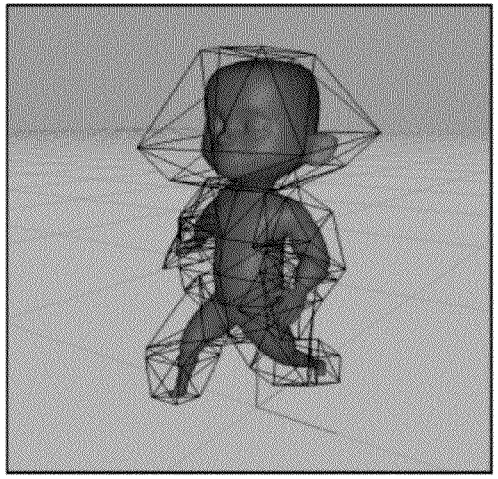
Figure 6D:
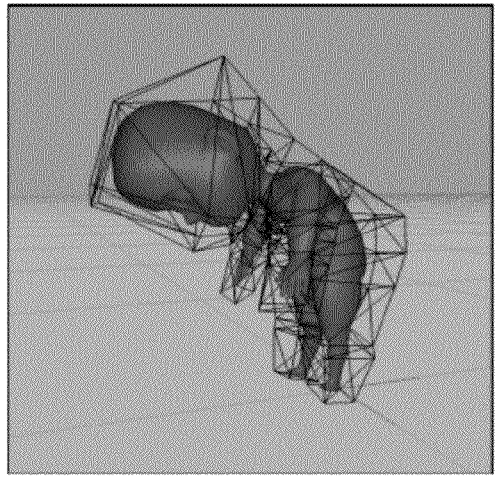

FIGS. 6A, 6B, 6C, and 6D depict deformations using interior coordinates in one embodiment according to the present invention. FIG. 6A depicts a posed character bound to a cage at bind-time. FIGS. 6B, 6C, and 6D show deformations of the character corresponding to three different poses of the cage using interior coordinates of the present invention.

Generalized Barycentric Coordinates

Generalizations of barycentric coordinates in two and higher dimensions have been shown to have a number of computer animation applications, including finite element analysis, definitions of S-patches (n-sided generalizations of Bézier surfaces), free-form deformations, mesh parametrization, and interpolation. Two-dimensional barycentric coordinates are used fundamentally in applications such as Gouraud shading of triangles and the definition of triangular Bézier patches. Given a triangle with vertices $T_1$, $T_2$, and $T_3$, barycentric coordinates allow every point p in the plane of the triangle to be expressed uniquely as a function of the barycentric coordinates of p with respect to the vertices $T_1$, $T_2$, and $T_3$.

The barycentric coordinates can be defined in many ways, one of the simplest being as requiring the coordinate function to be a unique linear function that satisfies given interpolation conditions. Similarly, barycentric coordinates in three dimensions can be defined relative to a non-degenerate tetrahedron with vertices $T_1$, $T_2$, $T_3$, and $T_4$ as unique linear functions that again satisfy given interpolation conditions.

Accordingly, most of the uses of barycentric coordinates stem from their use in the construction of linear interpolating functions. Gouraud shading is one example where colors $c_1$, $c_2$, and $c_3$ are assigned to vertices of a triangle. The colors then can be interpolated linearly across the triangle, again according to given interpolating functions. Similar techniques can also be used to define a deformation of a two-dimensional model. In general, if $T'_1$, $T'_2$, and $T'_3$ denote new positions for the vertices of the original triangle, the deformed position p' of point p can be defined as a function the barycentric coordinates of p with respect to the new vertices $T'_1$, $T'_2$, and $T'_3$.

However, problems arise in the definition of such two-dimensional coordinates (and corresponding interpolants) relative to polygons with more than three vertices. The interpolation conditions are still important, but it is no longer sufficient to require the coordinate functions to be linear. There are simply too many interpolation conditions to satisfy with linear functions. As discussed previously, some attempts made to overcome these limitations have been to generalize barycentric coordinates to arbitrary closed polygons in a plane and arbitrary closed polyhedra in space.

In one example, an object to be deformed is positioned relative to a coarse closed triangular surface mesh (which is referred to as the cage). The object is then "bound" to the cage by computing a weight $g_i(p)$ of each cage vertex Ci evaluated at the position of every object point p.

As the cage vertices are moved to new locations $C'_1$, the deformed points p' are computed from (Equation 1):

$$p' = \sum_i g_i(p) C'_1 \qquad (1)$$

The weights $g_i(p)$ are better known as generalized barycentric coordinates.

Interior Coordinates

In various embodiments, computer system 300 determines "interior coordinates" as generalized barycentric coordinates by one or more numerical solutions. In one example, computer system 300 determines interior coordinates as generalized barycentric coordinates by a numerical solution of Laplace's equation in the cage interior. Since solutions to Laplace's equation are generically referred to as harmonic functions, the interior coordinates generated by computer system 300 are called "harmonic coordinates," and the deformations generated by computer system 300 using harmonic coordinates are called "harmonic deformations."

As discussed previously, mean value coordinates are a form of generalized barycentric coordinates. The construction of mean value coordinates typically begins with a "mean value interpolant" of a function $f$ defined on a closed boundary (e.g., a cage). To compute an interpolant value for each interior point p, each point x on the boundary is considered, the reciprocal distance from x top is multiplied by $f(x)$, then an average is performed over all of x.

FIG. 7A depicts interpolation for mean value coordinates. FIG. 7A shows a cage 700 having a closed boundary 710, with cage point or vertex x on the closed boundary 710. Mean value coordinates involve straight-line distances irrespective of the visibility of x from p. In this example, the mean value interpolant involves a straight-line from p to x represented by path 720 of FIG. 7A.

Accordingly, a more useful interpolant than the one discussed above for mean value coordinates would respect visibility of a cage point from an object point. In various embodiments, to construct such an interpolant, computer system 300 averages not over all straight-line paths, but rather over all Brownian paths leaving p, where the value assigned to each path is the value of $f$ at the point the path first hits the cage boundary. FIG. 7B depicts interpolation for interior coordinates in one embodiment according to the present invention. FIG. 7B again depicts cage 700 having boundary 710. A path 730, as shown in FIG. 7B, is determined from p to x which respects visibility from p to x over path 730. Such an interpolant, as described above, typically can be produced in any dimension. Moreover, such an interpolant can be produced that in fact satisfies Laplace's equation subject to the boundary conditions given by $f$.

In various embodiments, computer system 300 determines interior coordinates that satisfy the following set of conditions. Consider an example where a cage C is a polyhedron in d dimensions. In other words, cage C is a closed (not necessarily convex) volume with a piecewise linear boundary. In two dimensions, cage C is a region of the plane bounded by a closed polygon. In three dimensions, cage C is a closed region of space bounded by planar (though not necessarily triangular) faces.

For each of the vertices $C_i$ of cage C, a function $h_i(p)$ is defined on cage C, subject to the following conditions:

1. Interpolation: $h_i(C_j)=\delta_{i,j}$.
2. Smoothness: The functions $h_i(p)$ are at least $C^1$ smooth in the interior of the cage.
3. Non-negativity: $h_i(p) \geqq 0$, for all p∈C.
4. Interior locality: The notion of interior locality is qualified as follows: interior locality holds, if, in addition to non-negativity, the coordinate functions have no interior extrema.
5. Linear reproduction: Given an arbitrary function $f(p)$, the coordinate functions can be used to define an interpolant $H[f](p)$ according to Equation (2):

$$H[f](p) = \sum_i h_i(p)f(C_i) \quad (2)$$

$H[f](p)$ is then is required to be exact for linear functions. By taking $f(p)=p$, then undesirable "popping" is resolved by Equation (3):

$$p = \sum_i h_i(p)C_i \quad (3)$$

6. Affine-invariance: $\Sigma_i h_i(p)=1$ for all p∈C.
7. Strict generalization of barycentric coordinates: when C is a simplex, $h_i(p)$ is the barycentric coordinate of p with respect to C.

As discussed previously, mean value coordinates posses all by two of these properties: interior locality and non-negativity. Additionally, cages used for character articulation often have large concavities.

In various embodiments, computer system 300 determines interior coordinate as systems of coordinates that satisfy the above seven properties. Coordinates systems that satisfy the above seven properties are generally referred to as "interior coordinates."

FIGS. 8A, 8B, and 8C depict deformations of a simple object 810 bound to a cage 820 using mean value coordinates and using interior coordinates in one embodiment of the present invention. FIG. 8A depicts object 810 and cage 820 at bind time. Cage 820 includes a vertex 830. FIG. 8B depicts deformation of object 810 using mean value coordinates at pose time. As shown in FIG. 8B, when vertex 830 of cage 820 is move from lower right to upper left to a new position, object 810 is deformed into object 840.

FIG. 8C depicts deformation of object 810 using interior coordinates in one embodiment according to the present invention. As shown in FIG. 8C, when vertex 830 of cage 820 is moved from lower right to upper left, object 810 is deformed by computer system 300 to generate object 850. FIG. 8B and FIG. 8C illustrate generally that for simple objects, the resulting object 840 of FIG. 8B generated using mean value coordinates and object 850 of FIG. 8C generated by computer system 300 using interior coordinates appear similar.

Figure 9A:
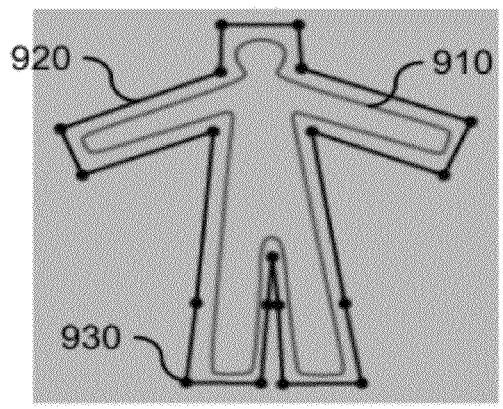
FIGS. 9A, 9B, and 9C depict deformations of a bipedal character object bound to a cage using mean value coordinates and using interior coordinates in one embodiment according to the present invention.
Figure 9B:
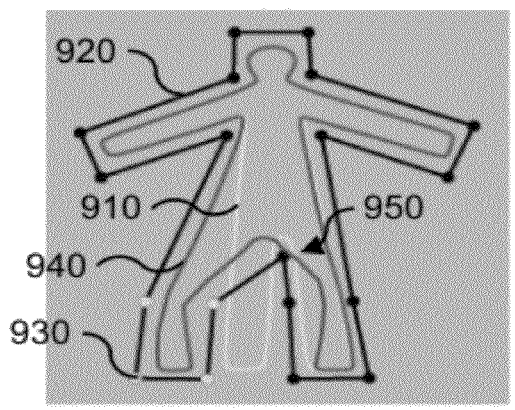
Figure 9C:
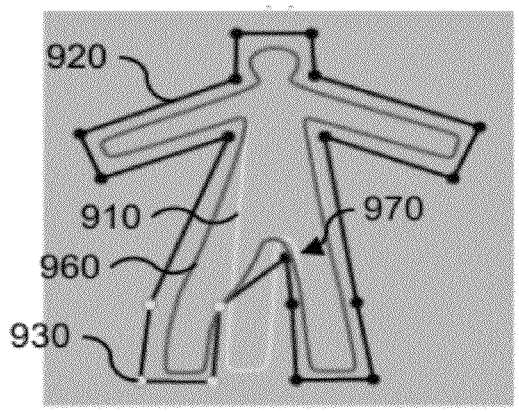

FIGS. 9A, 9B, and 9C depict deformations of a bipedal character object 910 bound to a cage 920 using mean value coordinates and using interior coordinates in one embodiment according to the present invention. FIG. 9A depicts bipedal character object 910 and cage 920 at bind time. Cage 920 includes a vertex 930. FIG. 9B depicts deformation of bipedal character object 910 using mean value coordinates at pose time. As shown in FIG. 9B, when a set of vertices (identified in yellow), including vertex 930, are moved from right to left, bipedal character object 910 is deformed to generate bipedal character object 940. FIG. 9B further shows that deformation of bipedal character object 910 using mean value coordinates causes bipedal character object 940 to include undesirable deformations in area 950.

FIG. 9C depicts deformation of bipedal character object 910 using interior coordinates in one embodiment according to the present invention. As shown in FIG. 9C, when the set of vertices (identified in yellow), including vertex 930, are moved from right to left, bipedal character object 910 is deformed by computer system 300 to generate bipedal character object 960. As shown in FIG. 9C, the resulting bipedal character object 960 includes little to no deformation artifacts in area 970, as compared to area 950 of bipedal character object 940 in FIG. 9B.

The undesirable behavior illustrated above in bipedal character object 940 of FIG. 9B occurs because mean value coordinates lack the two properties that facilitate high-end character articulation, namely: interior locality and non-negativity.

Interior coordinates can be obtained as solutions to equations satisfying the previously discussed seven properties, if boundary conditions are appropriately chosen (Equation 4):

$$\nabla^2 h_i(p)=0, \, p\in\text{Int}(C) \quad (4)$$

where p∈Int(C) means that points p are located within the interior of cage C, and therefore have interior locality.

For example, consider the construction of interior coordinate, such as "harmonic coordinates" as solutions to Laplace's equation in two dimensions. However, it will be understood that the construction of harmonic coordinates generalizes also to d dimensions. In this example, the appropriate boundary conditions for $h_i(p)$ in two dimensions are as follows. Let $\partial p$ denote a point on a boundary $\partial C$ of C, then in Equation (5):

$$h_i(\partial p) = \phi_i(\partial p), \text{ for all } \partial p \in \partial C \tag{5}$$

where $\phi_i(\partial p)$ is the (univariate) piecewise linear function such that $\phi_i(\partial C_j) = \delta_{i,j}$.

Figure 10A:
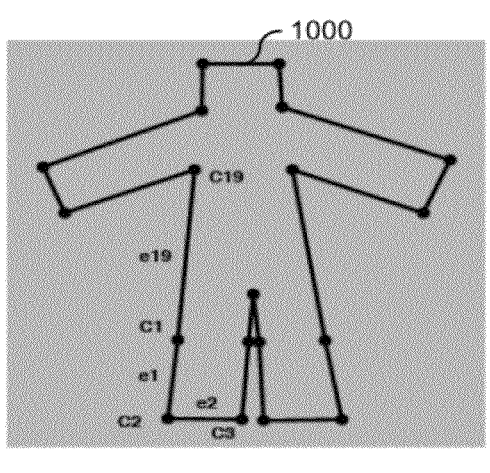
FIGS. 10A, 10B, and 10C depict comparisons between the resultant values determined for mean value coordinates and for interior coordinates in one embodiment according to the present invention.
Figure 10B:
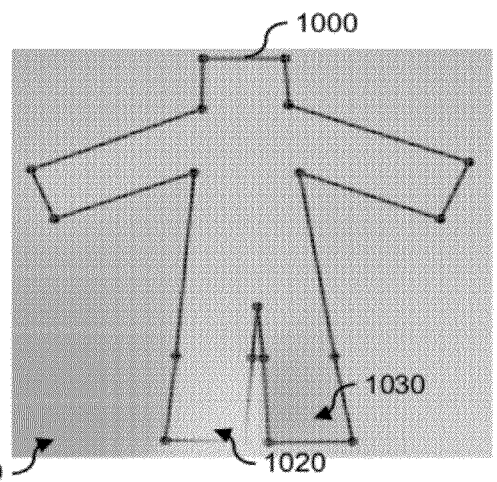
Figure 10C:
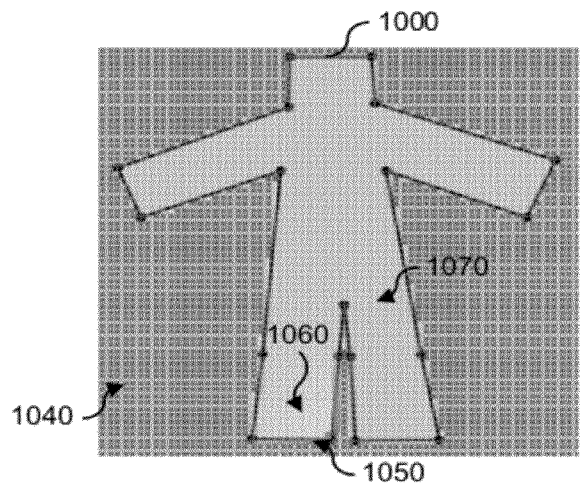

FIGS. 10A, 10B, and 10C depict comparisons between the resultant values determined for mean value coordinates and for harmonic coordinates in one embodiment according to the present invention. FIG. 10A depicts a 2D cage 1000 with vertices $C_1, \ldots C_{19}$ and edges $E_1, \ldots E_{19}$ at pose time. FIG. 10B depicts the values of mean value coordinates for vertex $C_3$ of cage 1000 based on each point in a grid. Values in green indicate negative values at points in the grid, and values in yellow indicate positive values at points in the grid. As shown in FIG. 10B, area 1010 indicates negative values outside of cage 1000 for points in the grid. Area 1020 indicates positive values inside of cage 1000 in the left leg. Area 1030 indicates negative values inside of cage 1000 for the right leg.

FIG. 10C depicts the values of harmonic coordinates for vertex $C_3$ of cage 1000 based on points in the grid in one embodiment according to the present invention. Values in red indicate the exterior of cage 1000 that are undefined for points in the grid, values in magenta indicate boundary values for points in the grid, and values in yellow indicate positive values for points in the grid. As shown in FIG. 10C, area 1050 indicates that the boundary values of cage 1000. Area 1060 depicts the relative influence of the position of vertex $C_3$ inside cage 1000. FIG. 10C illustrates that the corresponding influence of vertex $C_3$ in the remainder of area 1070 is essentially zero.

Accordingly, harmonic functions satisfying Equation (4) subject to Equation (5) possess the properties enumerated above, and discussed further below:

1. Interpolation: by construction $h_i(C_j) = \phi_i(C_j) = \delta_{i,j}$.
2. Smoothness: Away from the boundary harmonic coordinates are solutions to Laplace's equation, and hence they are $C^\infty$ in the cage interior. On the boundary they are only as smooth as the boundary conditions, and hence are only guaranteed to be $C^0$ on the boundary.
3. Non-negativity: harmonic functions achieve their extrema at their boundaries. Since boundary values are restricted to [0,1], interior values are also restricted to [0,1], and are therefore non-negative.
4. Interior locality: follows from non-negativity and the fact that harmonic functions possess no interior extrema.
5. Linear reproduction: Let $f(p)$ be an arbitrary linear function. Then $H[f](p)$ must be equivalent to $f(p)$, where $H[f](p)$ is defined as in Equation (2). Accordingly, let $H[f](p) = f(p)$ everywhere on the boundary of C. If p is a point on the boundary of C, then by construction (Equation 6):

$$H[f](\partial p) = \sum_i h_i(\partial p) f(C_i) = \sum_i \phi_i(\partial p) f(C_i) \tag{6}$$

The functions $\phi_i(\partial p)$ are the univariate linear B-spline basis functions (commonly known as the "hat function" basis), which are capable of reproducing all linear functions on $\partial C$ (in fact, they reproduce all piecewise linear functions on $\partial C$). Next the result is extended to the interior of C. Since $f(p)$ is linear, all second derivatives vanish. That is, $\nabla^2 f(p) = 0$ and $f(p)$ satisfies Laplace's equation on the interior of C. Since $H[f](p)$ is a linear combination of harmonic functions, it also satisfies Laplace's equation on the interior. $f(p)$ and $H[f](p)$ satisfy the same boundary conditions and are both solutions to Laplace's equation. Therefore, by uniqueness of solutions to Laplace's equation, they are the same function.

6. Affine invariance: The function $f(p) = 1$ is linear, so affine invariance follows immediately from the linear reproduction property.

7. Strict generalization of barycentric coordinates. If the cage C consists of a single triangle, the harmonic coordinates reduce to simple barycentric coordinates. For example, Let $\beta_j(p)$ denote the barycentric coordinates of p with respect to the triangle. To establish that $h_i(p) = \beta_j(p)$, note that $\beta_j(p)$ is a linear function, so we can use the linear reproduction property above by taking $f(p) = \beta_j(p)$:

$$\begin{aligned} \beta_j(p) &= H[\beta_i](p) \\ &= \sum_i h_i(p) \beta_j(C_i) \\ &= \sum_i h_i(p) \delta_{i,j} \\ &= h_j(p) \end{aligned}$$

In general, it is straightforward to generalize harmonic coordinates from two to d dimensions. First, consider harmonic coordinates in one dimension: the cage is a line segment bounded by two vertices $C_0$ and $C_1$, and Laplace's equation reduces to (Equation 7):

$$\frac{d^2 h_i(p)}{dp^2} = 0 \tag{7}$$

In this example, $h_i(p)$ is a linear function, and the proper (zero dimensional) boundary conditions come from the interpolation property: $h_i(C_j) = \delta_{i,j}$.

The next higher (two) dimensional construction for the cage C can then be reposed. Beginning with the interpolation conditions: $h_i(C_j) = \delta_{i,j}$. This determines the coordinates on the 0-dimensional facets (the vertices) of C. Next, the coordinates are extended to the 1-dimensional facets (the edges) of C using the one dimensional version of Laplace's equation. Finally, the 1-dimentional facets are extended to the two dimensional facets (the interior) of C using the two dimensional version of Laplace's equation.

In various embodiments, the cage may be a polytope, polygon, polyhedron, and other d-dimensional topologies.

The extension to three and higher dimensions follows immediately: the harmonic coordinates $h_i(p)$ for a d dimensional cage C with vertices $C_i$, are the unique functions such that: $h_i(C_j) = \delta_{i,j}$ and on every facet of dimension $k \leq d$, the k dimensional Laplace equation is satisfied.

These d dimensional harmonic coordinates possess the above required properties. In general, starting with the 1-dimentional facets as the base case, the discussion given above for two dimensions are valid in any dimension k assuming that linear reproduction is achieved on the k−1 facets.

Furthermore, harmonic coordinates have the following additional property that is shared by barycentric coordinates: Dimension reduction.

1. Dimension reduction: d dimensional harmonic coordinates, when restricted to a k<d dimensional facet, reduce to k dimensional harmonic coordinates.

For example, a three dimensional cage bounded by triangular facets possesses harmonic coordinates that reduce to barycentric coordinates on the faces. Similarly, a dodecahedral cage will have 3D harmonic coordinates that reduce to 2D harmonic coordinates on its pentagonal faces.

Interior Control

Deformations using interior coordinates are typically defined by the cage boundary, which is ideal in many instances. However, it is sometimes helpful to give artists optional control over the deformation in the cage interior. In various embodiments, additional control is provided by adding cage elements (e.g., vertices, edges, or faces) as interior control structures where needed.

Figure 11A:
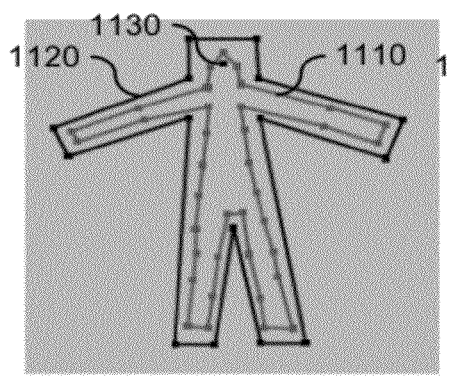
FIGS. 11A and 11B depict deformations of a bipedal character object bound to a cage using an interior control point positioned within the cage in one embodiment according to the present invention.
Figure 11B:
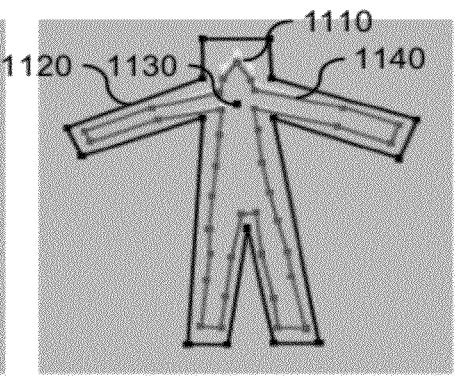

FIGS. 11A and 11B depict harmonic deformations of a bipedal character object 1110 bound to a cage 1120 using an interior control point 1130 positioned within cage 1120 in one embodiment according to the present invention. FIG. 11A depicts bipedal character object 1110 bounded by cage 1120 at pose time. As shown in FIG. 11A, an artist or operator of computer system 300 places interior control point 1130 inside of cage 1120. FIG. 11B depicts harmonic deformation of bipedal character object 1110 in one embodiment according to the present invention. As shown in FIG. 11B, when interior control point 1130 is moved downward, bipedal character object 1110 is deformed by computer system 300 to generate bipedal character object 1140.

The addition of interior cage elements, such as interior vertices and edges, need not form a manifold. Generally, it is sufficient for the interior of the cage to form what is called a "linear cell complex." A linear cell complex is a collection of "cells" of various dimensions, such as 0-cells (vertices), 1-cells (linear edges), 2-cells (planar faces), and so on, with the property that the intersection of any two cells is either empty or is another cell in the collection.

Harmonic coordinates can readily be defined with respect to all vertices of a linear cell complex. Accordingly, the interior facets are treated generally in the same way as the boundary facets. Formally, harmonic functions are only guaranteed to be $C^0$ across boundary elements. Thus, if a smooth object crosses an interior facet, its image under the deformation will only be $C^0$.

In character articulation however, smooth objects are generally not deformed; rather, B-spline or subdivision surface control points are typically deformed, then the deformed control points are used to create a smooth surface. In this way, minor mathematical discontinuities tend to be reduced.

Figure 12A:
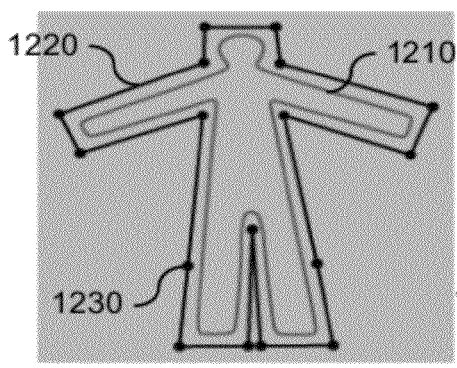
FIGS. 12A, 12B, 12C, and 12D depict deformations of a bipedal character object bound to a cage using a linear cell complex in one embodiment according to the present invention.
Figure 12B:
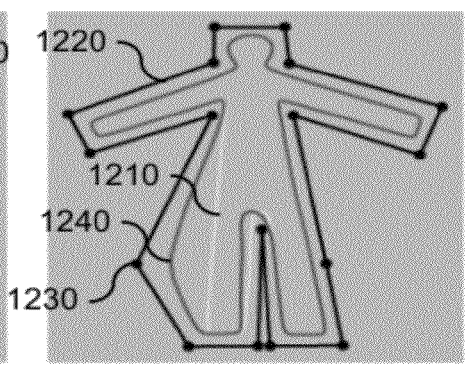

FIGS. 12A, 12B, 12C, and 12D depict harmonic deformations of a bipedal character object 1210 bound to a cage 1220 using a linear cell complex 1250 in one embodiment according to the present invention. FIG. 12A depicts bipedal character object 1210 and cage 1220 at pose time. Cage 1220 includes a vertex 1230. FIG. 12B depicts harmonic deformation of bipedal character object 1210 in one embodiment according to the present invention. As shown in FIG. 12B, when vertex 1230 of cage 1220 is moved from left to right, bipedal character object 1210 is deformed by computer system 300 to generate bipedal character object 1240. As shown in FIG. 12B there is a small amount of deformation in the right left of bipedal character object 1240.

Figure 12C:
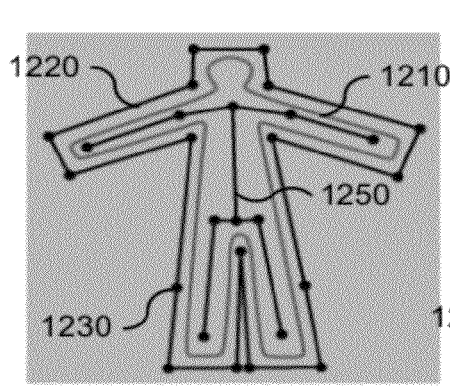
Figure 12D:
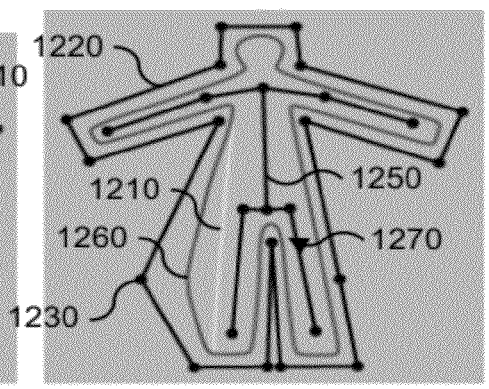

FIG. 12C depicts bipedal character object 1210 and cage 1220 at pose time in another embodiment of the present invention. In this example, cage 1220 includes vertex 1230. The additional interior control structure 1250 (e.g., a linear cell complex) is included inside cage 1220. Interior control structure 1250 appears as a stick figure inside of bipedal character object 1210. FIG. 12D depicts harmonic deformation of bipedal character object 1210 using interior control structure 1250 in one embodiment of the present invention. As shown in FIG. 12D, as vertex 1230 is moved from left to right, bipedal character object 1220 is deformed by computer system 300 to generate bipedal character object 1260. As shown in FIG. 12D, interior control structure 1250 minimizes and/or eliminates deformations that occur in area 1270 of the right leg.

Figure 13A:
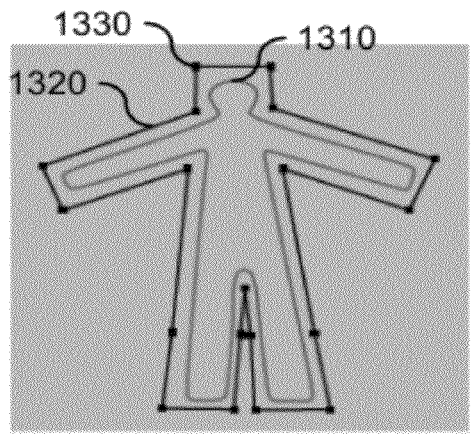
FIGS. 13A, 13B, 13C, and 13D depict another example of deformations of a bipedal character object bound to a cage using a linear cell complex in one embodiment according to the present invention.
Figure 13B:
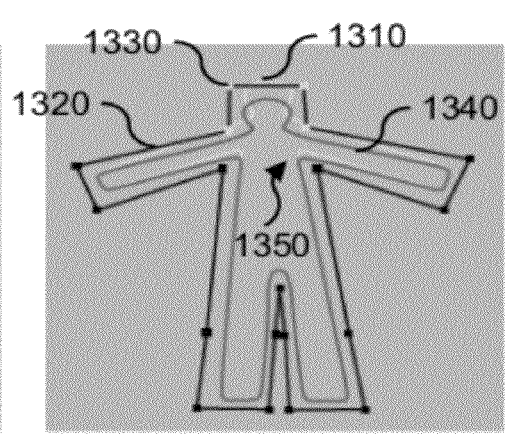

FIGS. 13A, 13B, 13C, and 13D depict another example of harmonic deformations of a bipedal character object 1310 bound to a cage 1320 using a linear cell complex 1360 in one embodiment according to the present invention. FIG. 13A depicts bipedal character object 1310 and cage 1320 at pose time. Cage 1320 includes a vertex 1330. FIG. 13B depicts harmonic deformation of bipedal character object 1310 in one embodiment according to the present invention. As shown in FIG. 13B, when a set of vertices (indicated in yellow), including vertex 1330, of cage 1320 is moved downward, bipedal character object 1310 is deformed by computer system 300 in the head region to generate bipedal character object 1340. As shown in FIG. 13B, bipedal character object 1340 includes slight deformations in area 1350.

Figure 13C:
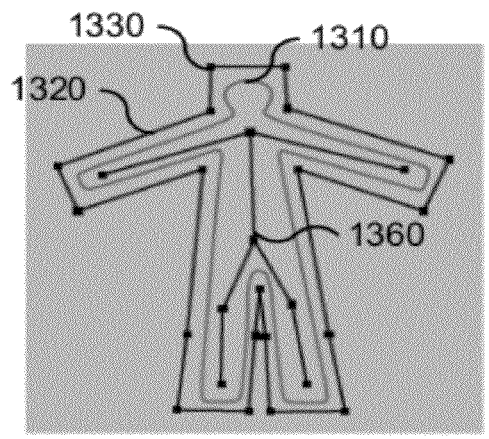
Figure 13D:
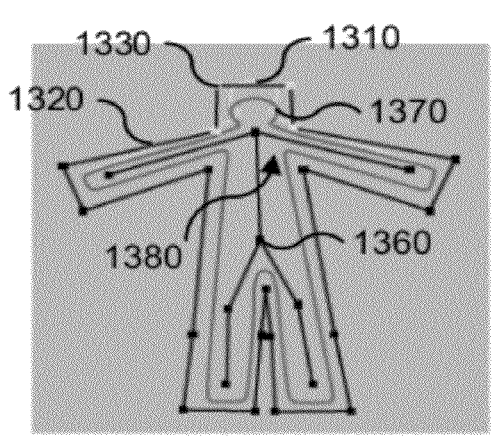

FIG. 13C depicts bipedal character object 1310 and cage 1320 at pose time in a further embodiment according to the present invention. In this example, the additional interior control structure 1360 is positioned within cage 1320. Interior control structure 1360 appears as a stick figure within bipedal character object 1310. FIG. 13D depicts harmonic deformation of bipedal character object 1310 using interior control structure 1360 in one embodiment of the present invention. As shown in FIG. 13D, when a set of vertices (indicated in yellow), including vertex 1330, of cage 1320 is moved downward, bipedal character object 1310 is deformed by computer system 300 to generate bipedal character object 1370. In this example, interior control structure 1360 minimizes and/or reduces the effect of the deformation to bipedal character object 1370 in area 1380.

Figure 14A:
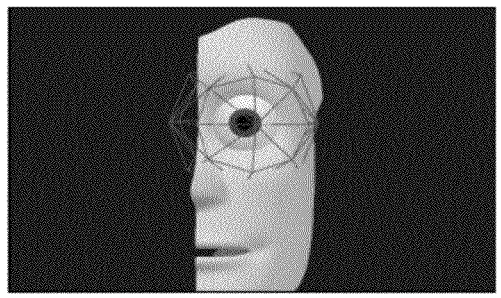
FIGS. 14A, 14B, 14C, 14D, 14E, and 14F depict deformations using interior control structures in one embodiment according to the present invention.

FIGS. 14A, 14B, 14C, 14D, 14E, and 14F depict harmonic deformations using interior control structures in one embodiment according to the present invention. In these examples, the region around a character's eye is deformed. As mentioned above, the object points are used to define subdivision control meshes, in this case for two surfaces: one for the face, and one for the eye ball. All object points within the cage shown in FIG. 14A are affected by the cage deformation. Binding these points to the cage and applying the harmonic deformation results in poses like the one shown in FIG. 14B.

Figure 14B:
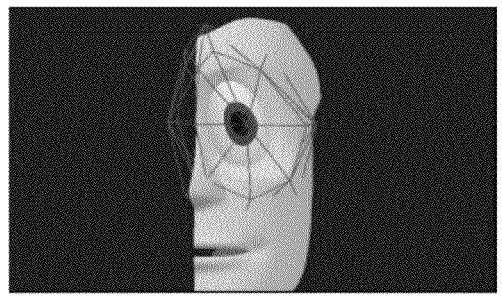
Figure 14C:
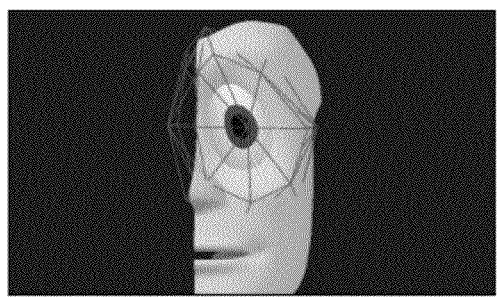
Figure 14D:
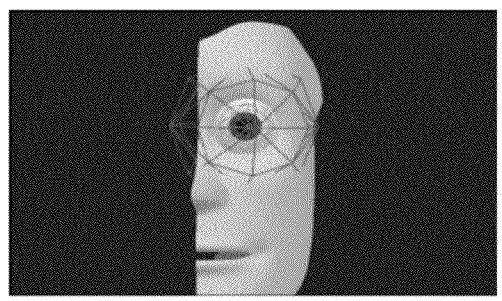

Since the control points just inside the cage are deformed fully, and those just outside the cage are left unchanged, the subdivision meshes are far from smooth as shown in FIG. 14B. This is a common issue in character articulation. In various embodiments, computer system 300 provides a character rigging system facility similar to cluster weighting. In this situation the weights are used to feather out the influence of the deformer near its boundary. Proper weighting results in smoother poses like the one shown in FIG. 14C.

Because of the convex nature of the cage, deformations in the example to this point could have been created using mean value coordinates. However, in various embodiments, computer system 300 allows the author to modify the deformation so that the iris and pupil stay round as the geometry around them deforms.

Figure 14E:
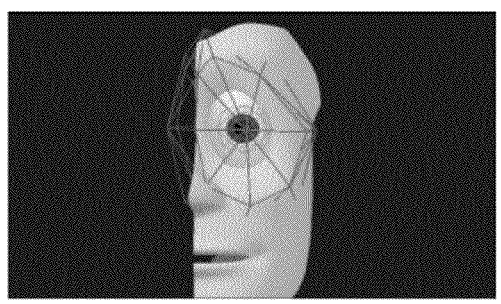
Figure 14F:
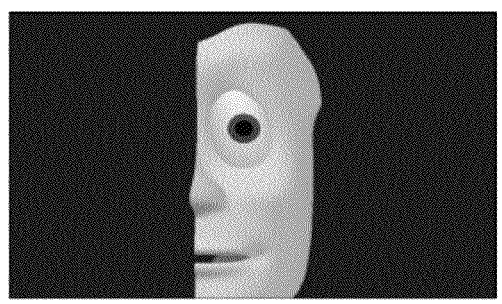

This is accomplished by augmenting the cage with an interior triangulated sphere (shown in green in FIG. 14D) that surrounds the iris and pupil. By keeping the interior green component of the cage fixed, the iris and pupil stay round as the geometry around them deforms, as shown in FIGS. 14E and 14F. This kind of precise interior control is not know to be possible using mean value coordinates. By adding the green triangulated sphere to the cage as shown FIG. 14D, the desired result is easily achieved using harmonic coordinates, as shown in FIG. 14E. FIG. 14F shows the deformed limit subdivision surfaces without the cages.

Dynamic Binding

In various embodiments, static bindings between the object or model and the cage are typically provided. In these embodiments, object point locations are assumed to be known at the time harmonic coordinates are computed. In some embodiments, harmonic coordinates are pre-determined with respect to all potential object point locations. Subsequent harmonic coordinate then may be interpolated from these pre-computed values to provide dynamic binding between the object and the cage.

Figure 15A:
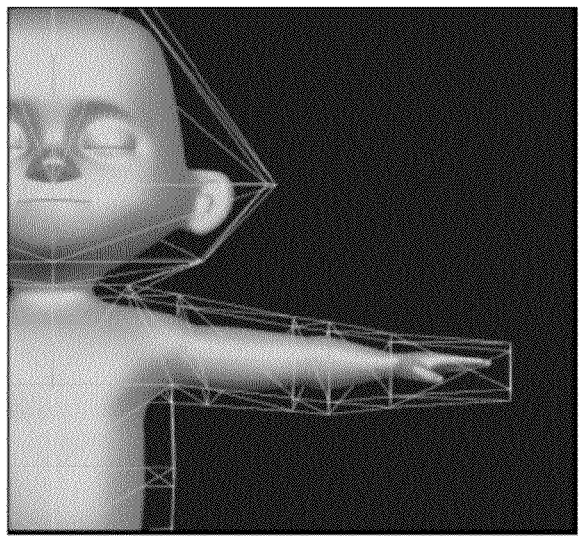
FIGS. 15A, 15B, and 15C depict deformations based on dynamic binding in one embodiment according to the present invention.
Figure 15B:
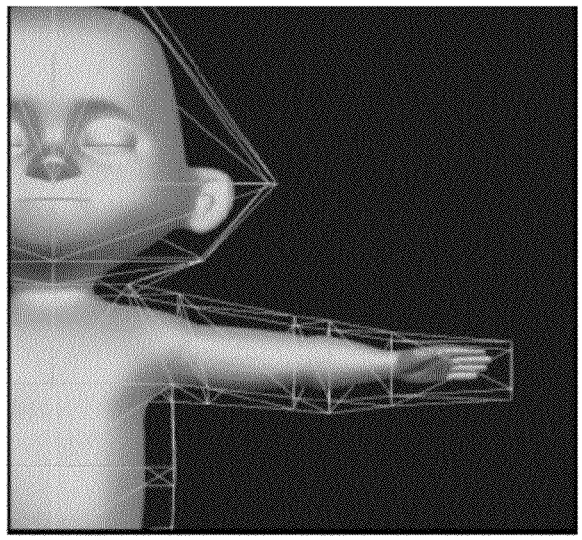
Figure 15C:
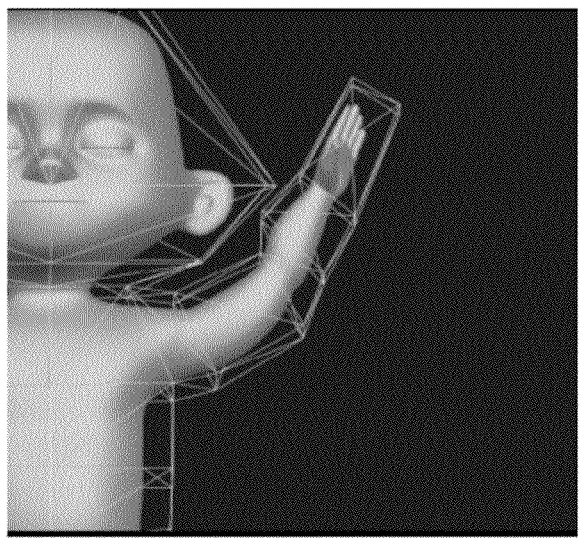

However, consider a situation such as the one shown in FIGS. 15A, 15B, and 15C where an arm is twisted within the cage, then is bound to the cage and deformed. FIGS. 15A, 15B, and 15C depict harmonic deformations based on dynamic binding in one embodiment according to the present invention. FIG. 15A depicts an object and a cage in their rest poses in one embodiment according to the present invention. FIG. 15B depicts an arm of the object of FIG. 15A that is twisted within the cage. FIG. 15C depicts binding of the arm to the cage, and its subsequent deformation. Both the arm twist and the cage deformation must occur at real-time rates for use by animators. Since the arm twist changes the position of object points within the cage, the object point locations are not known in advance.

In various embodiments, computer system 300 stores entire solution grids for each coordinate at pre-computation time to address this issue. In general, at pose time, computer system 300 uses multi-linear interpolation to compute the coordinates at each of the object points prior to applying Equation (1). This process is referred to as "dynamic binding."

Naively storing the solution grids to support dynamic binding requires prohibitive amounts of memory. In one example, the solution grids for the coarsest acceptable discretization level for the character shown in FIG. 15A took approximately 100 MB to store naively. However, since each harmonic coordinate decays relatively quickly away from its corresponding cage point, significant savings are possibly by sparsely storing the coordinate grids.

In another example, a sparse grid data structure is used to represent the solution grids. In the example, the sparse grid data structure used consists of an array, with one entry per grid cell. The contents of entry (i, j) consists of a list of index-value pairs, where the index names a cage vertex, and the value is the harmonic coordinate for that cage vertex at cell (i, j). The structure is sparse because only the index-value pairs whose value is above a threshold are stored. Using this scheme in this example, the solution grids for the coarsest acceptable discretization level for the character shown in FIG. 15A required about 1 MB to store.

In various embodiments, computer system 300 provides systems of coordinates, such as harmonic coordinates as generalized barycentric coordinates produced as solutions of Laplace's equation, that offer an effective character deformation method that improves on previous methods in several ways. First, computer system 300 provides interior coordinates that are always non-negative, and that their influence falls off with distance as measured within a control cage. Second, computer system 300 provides interior deformations that offer greater topological freedom in crafting control cages. Specifically, arbitrary linear cell complexes can be used where necessary to more precisely control the nature of the deformation.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for manipulating computer-generated objects in a computer-generated scene, the method comprising:

receiving, at one or more computer systems, information specifying a first object in the computer-generated scene, the first object forming a boundary;

receiving, at the one or more computer systems, information specifying a second object in the computer-generated scene, the second object located at least in part within the boundary formed by the first object;

determining, with one or more processors associated with the one or more computer systems, generalized barycentric coordinates for a first location located within the boundary based on position of one or more selected locations on the boundary and position of one or more selected locations on the part of the second object located within the boundary, position of the first location being different from the position of the one or more selected locations on the part of the second object located within the boundary;

interpolating, with the one or more processors associated with the one or more computer systems, at least one value for the first location based on the determined generalized barycentric coordinates for the first location; and storing, in a storage device associated with the one or more computer systems, information associated with the at least one interpolated value for the first location.

2. The method of claim 1 further comprising:

receiving, at the one or more computer systems, information specifying a change in the position of one or more of the one or more selected locations on the boundary or a change in the position of one or more of the one or more selected locations on the part of the second object located within the boundary; and modifying, with the one or more processors associated with the one or more computer system, the at least one interpolated value for the first location in response to the change in the position of one or more of the one or more selected locations on the boundary or the change in the position of one or more of the one or more selected locations on the part of the second object located within the boundary.

3. The method of claim 1 further comprising:

receiving, at the one or more computer systems, information specifying a change in the position of one or more of the one or more selected locations on the boundary or a change in the position of one or more of the one or more selected locations on the part of the second object located within the boundary; and modifying, with the one or more processors associated with the one or more computer system, at least one interpolated value for a second location located within the boundary in response to the change in the position of one or more of the one or more selected locations on the boundary or the change in the position of one or more of the one or more selected locations on the part of the second object located within the boundary while preserving the at least one interpolated value for the first location.

4. The method of claim 1 wherein determining, with the one or more processors associated with the one or more computer systems, generalized barycentric coordinates for the first location located within the boundary based on the position of one or more selected locations on the boundary and the position of one or more selected locations on the part of the second object located within the boundary comprises determining coordinate components for each location on the boundary and on the part of the second object located within the boundary as a barycenter of masses placed at each of the one or more selected locations on the boundary and each of the one or more selected locations on the part of the second object located within the boundary.

5. The method of claim 1 wherein the one or more selected locations on the boundary or on the part of the second object located within the boundary comprises at least one of a point, a line, a surface, and a polytope.

6. The method of claim 1 wherein interpolating, with the one or more processors associated with the one or more computer systems, the at least one value for the first location comprises interpolating one or more parameters defining a surface.

7. The method of claim 1 wherein interpolating, with the one or more processors associated with the one or more computer systems, the at least one value for the first location comprises interpolating one or more portions of data associated with elements of the first object or another object.

8. The method of claim 1 further comprising:

receiving, at the one or more computer systems, information specifying a third object in the computer-generated scene, the third object located at least in part within the boundary formed by the first object, the third object being a model, the first object being a first control structure, and the second object being a second control structure; and wherein determining, with one or more processors associated with the one or more computer systems, the generalized barycentric coordinates for the first location located within the boundary comprises determining generalized barycentric coordinates for a location on the part of the third object located within the boundary based on the position of the one or more selected locations on the boundary formed by the first control structure and the position of the one or more selection location on the part of the second control structure located within the boundary.

9. A non-transitory computer-readable medium storing computer-executable code for manipulating computer-generated objects in a computer-generated scene, the non-transitory computer-readable medium comprising:

code for receiving information specifying a first object in the computer-generated scene, the first object forming a boundary;

code for receiving information specifying a second object in the computer-generated scene, the second object located at least in part within the boundary formed by the first object;

code for determining generalized barycentric coordinates for a first location located within the boundary based on position of one or more selected locations on the boundary and position of one or more selected locations on the part of the second object located within the boundary, position of the first location being different from the position of the one or more selected locations on the part of the second object located within the boundary; and code for interpolating at least one value for the first location based on the determined generalized barycentric coordinates for the first location.

10. The non-transitory computer-readable medium of claim 9 further comprising:

code for receiving information specifying a change in the position of one or more of the one or more selected locations on the boundary or a change in the position of one or more of the one or more selected locations on the part of the second object located within the boundary; and code for modifying the at least one interpolated value for the first location in response to the change in the position of one or more of the one or more selected locations on the boundary or the change in the position of one or more of the one or more selected locations on the part of the second object located within the boundary.

11. The non-transitory computer-readable medium of claim 9 further comprising:

code for receiving information specifying a change in the position of one or more of the one or more selected locations on the boundary or a change in the position of one or more of the one or more selected locations on the part of the second object located within the boundary; and code for modifying at least one interpolated value for a second location located within the boundary in response to the change in the position of one or more of the one or more selected locations on the boundary or the change in the position of one or more of the one or more selected locations on the part of the second object located within the boundary while preserving the at least one interpolated value for the first location.

12. The non-transitory computer-readable medium of claim 9 wherein the code for determining generalized barycentric coordinates for the first location located within the boundary based on the position of one or more selected locations on the boundary and the position of one or more selected locations on the part of the second object located within the boundary comprises code for determining coordinate components for each location on the boundary and on the part of the second object located within the boundary as a barycenter of masses placed at each of the one or more selected locations on the boundary and each of the one or more selected locations on the part of the second object located within the boundary.

13. The non-transitory computer-readable medium of claim 9 wherein the one or more selected locations on the boundary or on the part of the second object located within the boundary comprises at least one of a point, a line, a surface, and a polytope.

14. The non-transitory computer-readable medium of claim 9 wherein the code for interpolating the at least one value for the first location comprises code for interpolating one or more parameters defining a surface.

15. The non-transitory computer-readable medium of claim 9 wherein the code for interpolating the at least one value for the first location comprises code for interpolating one or more portions of data associated with elements of the first object or another object.

16. The non-transitory computer-readable medium of claim 9 further comprising:
   code for receiving information specifying a third object in the computer-generated scene, the third object located at least in part within the boundary formed by the first object, the third object being a model, the first object being a first control structure, and the second object being a second control structure; and
   wherein the code for determining the generalized barycentric coordinates for the first location located within the boundary comprises code for determining generalized barycentric coordinates for a location on the part of the third object located within the boundary based on the position of the one or more selected locations on the boundary formed by the first control structure and the position of the one or more selection location on the part of the second control structure located within the boundary.

* * * * *